United States Patent
Fukumoto et al.

(10) Patent No.: US 10,214,176 B2
(45) Date of Patent: Feb. 26, 2019

(54) GAS GENERATOR

(71) Applicant: DAICEL CORPORATION, Osaka-shi, Osaka (JP)

(72) Inventors: Kenji Fukumoto, Tatsuno (JP); Tomoharu Kobayashi, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 137 days.

(21) Appl. No.: 15/509,604

(22) PCT Filed: Aug. 24, 2015

(86) PCT No.: PCT/JP2015/073650
§ 371 (c)(1),
(2) Date: Mar. 8, 2017

(87) PCT Pub. No.: WO2016/051998
PCT Pub. Date: Apr. 7, 2016

(65) Prior Publication Data
US 2017/0282843 A1    Oct. 5, 2017

(30) Foreign Application Priority Data
Sep. 29, 2014 (JP) .................... 2014-197896

(51) Int. Cl.
*B60R 21/272* (2006.01)
*B60R 21/274* (2011.01)

(52) U.S. Cl.
CPC .......... *B60R 21/272* (2013.01); *B60R 21/274* (2013.01)

(58) Field of Classification Search
CPC ........................... B60R 21/274; B60R 21/272
See application file for complete search history.

(56) References Cited

U.S. PATENT DOCUMENTS 3,869,143 A * 3/1975 Merrell ................. B60R 21/272
                                                           200/83 N
3,897,962 A * 8/1975 Sack ...................... B60R 21/26
                                                           239/265.15
(Continued)

FOREIGN PATENT DOCUMENTS

CN    103140389 A    6/2013
JP    10-230814 A    9/1998
(Continued)

*Primary Examiner* — Troy Chambers
*Assistant Examiner* — Bridget A Cochran
(74) *Attorney, Agent, or Firm* — Birch, Stewart, Kolasch & Birch, LLP (57) ABSTRACT

The present invention provides a gas generator, including in a cylindrical housing, an ignition device chamber provided with an ignition device, a gas inflow chamber having a gas discharge port and a pressurized gas chamber being arranged in the above order from the first end,
a rupturable plate closing between the pressurized gas chamber and the gas inflow chamber and being fixed to an annular fixing portion,
a breaking device for the rupturable plate being arranged between the ignition device chamber and the gas inflow chamber,
the breaking device including a base, a rod main body which extends from the base towards the rupturable plate, and an enlarged-diameter portion at a distal end of the rod main body, and during actuation, the base moving in the axial direction, the enlarged-diameter portion being positioned inside the pressurized gas chamber after punching out the rupturable plate, and the rod main body portion being positioned so as to oppose the annular fixing portion in a radial direction,
a pressurized gas passing through a gas passage and then is discharged from the gas discharge port, the gas
(Continued)

passage including a first annular passage in which a width between the enlarged-diameter portion and the annular fixing portion varies and a second annular passage between the rod main body portion and the annular fixing portion, a cross-sectional area of the second annular passage being the smallest among the cross-sectional area of the second annular passage, an area of a minimum width portion of the first annular passage and a total opening area of the gas discharge port, and Q<(A2−A1) being satisfied when Q denotes the cross-sectional area of the second annular passage, A1 denotes an area of the punched-out rupturable plate and A2 denotes the area of the minimum width portion of the first annular passage.

7 Claims, 6 Drawing Sheets

(56) References Cited

U.S. PATENT DOCUMENTS

| | | | | |
|---|---|---|---|---|
| 3,901,530 | A * | 8/1975 | Radke | B60R 21/217 280/736 |
| 5,230,531 | A * | 7/1993 | Hamilton | B60R 21/272 222/5 |
| 5,242,194 | A * | 9/1993 | Popek | B60R 21/272 137/68.13 |
| 5,345,876 | A * | 9/1994 | Rose | B60R 21/272 102/531 |
| 5,406,889 | A * | 4/1995 | Letendre | B60R 21/2644 102/201 |
| 5,437,188 | A * | 8/1995 | Frantom | B60R 21/272 73/709 |
| 5,456,492 | A * | 10/1995 | Smith | B60R 21/26 137/68.13 |
| 5,462,307 | A * | 10/1995 | Webber | B60R 21/272 222/5 |
| 5,482,315 | A * | 1/1996 | Chandler, Jr. | B60R 21/2032 280/730.1 |
| 5,518,268 | A * | 5/1996 | Moore | B60R 21/272 280/737 |
| 5,533,751 | A * | 7/1996 | Kort | B60R 21/272 280/737 |
| 5,542,702 | A * | 8/1996 | Green | B60R 21/268 222/3 |
| 5,570,904 | A * | 11/1996 | Cuevas | B60R 21/272 280/737 |
| 5,582,426 | A * | 12/1996 | O'Loughlin | B60R 21/272 280/736 |
| 5,607,181 | A * | 3/1997 | Richardson | B60R 21/264 222/3 |
| 5,653,463 | A * | 8/1997 | Jeong | B60R 21/272 222/5 |
| 5,660,412 | A * | 8/1997 | Renfroe | B60R 21/272 280/737 |
| 5,732,972 | A * | 3/1998 | Johnson | B60R 21/272 102/531 |
| 5,762,368 | A * | 6/1998 | Faigle | B60R 21/272 102/531 |
| 5,763,817 | A * | 6/1998 | Renfroe | B60R 21/272 102/288 |
| 5,941,563 | A * | 8/1999 | Schoenborn | B60R 21/261 280/736 |
| 6,010,153 | A * | 1/2000 | Halas | B60R 21/272 137/68.13 |
| 6,079,740 | A * | 6/2000 | Barth | B60R 21/2644 102/530 |
| 6,095,556 | A * | 8/2000 | Bailey | B60R 21/272 102/204 |
| 6,116,641 | A * | 9/2000 | Scheffee | B60R 21/272 280/736 |
| 6,142,514 | A * | 11/2000 | Yamato | B60R 21/272 280/736 |
| 6,231,079 | B1 * | 5/2001 | Perotto | B60R 21/272 280/737 |
| 6,237,950 | B1 * | 5/2001 | Cook | B60R 21/264 102/531 |
| 6,273,462 | B1 * | 8/2001 | Faigle | B60R 21/264 280/737 |
| 6,289,820 | B1 * | 9/2001 | Anacker | B60R 21/272 102/530 |
| 6,382,668 | B1 * | 5/2002 | Goetz | B60R 21/264 280/737 |
| 6,499,764 | B2 * | 12/2002 | Anacker | B60R 21/272 102/530 |
| 6,676,157 | B2 * | 1/2004 | Nanbu | B60R 21/268 280/736 |
| 7,431,337 | B2 * | 10/2008 | Matsuda | F42B 3/045 102/202 |
| 7,588,265 | B2 * | 9/2009 | Blackburn | B60R 21/268 280/737 |
| 2003/0151241 | A1 * | 8/2003 | Matsuda | B60R 21/261 280/736 |
| 2004/0021306 | A1 * | 2/2004 | Lell | B01D 45/06 280/736 |
| 2004/0046374 | A1 * | 3/2004 | Yamazaki | B60R 21/261 280/741 |
| 2004/0084884 | A1 * | 5/2004 | Yamazaki | B60R 21/272 280/741 |
| 2005/0035581 | A1 * | 2/2005 | Katsuda | B60R 21/261 280/741 |
| 2005/0062273 | A1 * | 3/2005 | Matsuda | B60R 21/272 280/737 |
| 2005/0077713 | A1 * | 4/2005 | Matsuda | B60R 21/272 280/741 |
| 2005/0110254 | A1 * | 5/2005 | Engler | B60R 21/2644 280/736 |
| 2005/0146123 | A1 * | 7/2005 | Bergmann | B60R 21/272 280/741 |
| 2005/0161922 | A1 * | 7/2005 | Bilbrey | B60R 21/2338 280/736 |
| 2005/0189750 | A1 * | 9/2005 | Gotoh | B60R 21/272 280/737 |
| 2005/0189751 | A1 * | 9/2005 | Tokuda | B60R 21/272 280/737 |
| 2005/0218636 | A1 * | 10/2005 | Falkowski | B60R 21/26 280/737 |
| 2005/0230948 | A1 * | 10/2005 | Al-Amin | B60R 21/272 280/736 |
| 2005/0230950 | A1 * | 10/2005 | Fischer | B60R 21/272 280/737 |
| 2005/0275203 | A1 * | 12/2005 | Yano | B60R 21/272 280/737 |
| 2005/0280251 | A1 * | 12/2005 | Yano | B60R 21/272 280/736 |
| 2006/0006632 | A1 * | 1/2006 | Tokuda | B60R 21/261 280/736 |
| 2006/0076762 | A1 * | 4/2006 | Nakayasu | B60R 21/268 280/737 |
| 2006/0103123 | A1 | 5/2006 | Myers | |
| 2006/0157960 | A1 * | 7/2006 | Matsuda | B60R 21/272 280/736 |
| 2006/0201572 | A1 * | 9/2006 | Matsuda | F17C 5/06 141/1 |
| 2006/0202455 | A1 * | 9/2006 | Matsuda | B60R 21/272 280/736 |
| 2006/0249938 | A1 * | 11/2006 | Matsuda | B60R 21/261 280/736 |
| 2007/0069511 | A1 | 3/2007 | Nakayasu | |
| 2007/0075534 | A1 * | 4/2007 | Kelley | B60R 21/272 280/736 |
| 2007/0200326 | A1 * | 8/2007 | Nakayasu | B60R 21/268 280/736 |
| 2008/0023948 | A1 * | 1/2008 | Kitayama | B60R 21/272 280/736 |

(56) References Cited

U.S. PATENT DOCUMENTS

| | | | | |
|---|---|---|---|---|
| 2008/0136153 A1* | 6/2008 | Yamashita | ............ | B60R 21/261 280/736 |
| 2008/0284148 A1* | 11/2008 | Bjorklund | ............ | B60R 21/268 280/737 |
| 2009/0051152 A1* | 2/2009 | Yamashita | ............ | B21D 39/06 280/743.1 |
| 2009/0091110 A1* | 4/2009 | Nakayasu | ........... | B60R 21/2644 280/741 |
| 2009/0115175 A1* | 5/2009 | Nishimura | .......... | B60R 21/2644 280/741 |
| 2009/0313821 A1* | 12/2009 | Asanuma | ............. | B60R 21/268 29/888 |
| 2010/0031844 A1* | 2/2010 | Tanaka | .................. | B60R 21/272 102/530 |
| 2010/0071581 A1* | 3/2010 | Asanuma | ............. | B60R 21/272 102/530 |
| 2011/0018243 A1* | 1/2011 | Yano | ..................... | B60R 21/272 280/741 |
| 2012/0079958 A1* | 4/2012 | Nakayasu | ............ | B60R 21/272 102/530 |
| 2012/0187667 A1* | 7/2012 | Jung | ..................... | B60R 21/272 280/737 |
| 2014/0123868 A1* | 5/2014 | Kobayashi | ............ | B60R 21/272 102/530 |
| 2014/0208975 A1* | 7/2014 | Kobayashi | ............ | B60R 21/272 102/530 |
| 2017/0066403 A1* | 3/2017 | Heyer | ................... | B60R 21/268 |

FOREIGN PATENT DOCUMENTS

| | | |
|---|---|---|
| JP | 2000-354756 A | 12/2000 |
| JP | 2007-223485 A | 9/2007 |
| JP | 2008-509834 A | 4/2008 |
| JP | 2014-94614 A | 5/2014 |

\* cited by examiner

GAS GENERATOR

TECHNICAL FIELD

The present invention relates to a gas generator which is usable for an airbag apparatus to be installed on a vehicle, and in which a pressurized gas is used.

DESCRIPTION OF RELATED ART

In U.S. Pat. No. 5,242,194, FIG. 1 depicts an invention of an inflator in which a pressurized gas is used, and FIGS. 2 to 5 depict states before actuation (FIG. 2), during actuation (FIGS. 3 and 4) and after actuation (FIG. 5), respectively.

As depicted in FIG. 3, by initiation of an igniter 177, a pointed tip 155 of a piston 132 breaks a center portion of a burst disk 52.

Subsequently, as depicted in FIG. 4, with the pointed tip 155 of the piston 132 stuck in the center portion of the burst disk 52, the burst disk 52 cut out in a donut shape is held by an annular pointed tip 194 of the piston 132.

Then, as depicted in FIG. 5, the annular pointed tip 194 of the piston 132 collides with a holder 86 while still holding the burst disk 52 cut out in the donut shape. At this point, the pointed tip 155 of the piston 132 fits into an opening 102 of the holder 86, and the burst disk 52 cut out in the donut shape is held between the annular pointed tip 194 of the piston 132 and the holder 86.

A pressurized gas passes through an opening 92 and then through an annular space between a circular opening 66 and the piston 132 (a piston rod 154), and thereafter the gas is discharged from an outlet opening 62.

In parallel with this, flames or the like of the igniter 177 passes through a cylindrical passage 156 inside the piston 132 and ignites a booster charge 44 and a gas generating agent 42 in a body 46 to generate a high-temperature gas. The high-temperature gas flows into a chamber 22 from an orifice 116. The high-temperature gas is then discharged from the outlet opening 62 together with the remaining pressurized gas.

SUMMARY OF INVENTION

The Invention 1 of the present invention provides a gas generator, including:

a cylindrical housing having a first end whose opening is fixed with an ignition device, and a closed second end on an axially opposite side of the first end, the cylindrical housing including an ignition device chamber provided with the ignition device, a gas inflow chamber having a gas discharge port, and a pressurized gas chamber, the ignition device chamber, the gas inflow chamber and the pressurized gas chamber being arranged in the cylindrical housing, in the above order from the first end;

a rupturable plate closing between the pressurized gas chamber and the gas inflow chamber and being fixed to an annular fixing portion extending radially inward from an inner circumferential wall surface of the cylindrical housing;

a breaking device for the rupturable plate being arranged between the ignition device chamber and the gas inflow chamber, the breaking device including, a base whose outer circumferential surface abuts against the inner circumferential wall surface of the cylindrical housing, the base moving by a predetermined length (a length L) during actuation, and a rod which extends from the base towards the rupturable plate, the rod including a rod main body portion which extends from the base, and an enlarged-diameter portion which has a diameter enlarged radially at a distal end portion of the rod main body portion;

the rupturable plate being fixed to the annular fixing portion, the rupturable plate facing a distal end surface of the enlarged diameter portion, when the base of the breaking device moves in the axial direction by the length L during actuation, the enlarged-diameter portion of the breaking device being positioned inside the pressurized gas chamber after punching out the rupturable plate from the annular fixing portion, and the rod main body portion being positioned so as to oppose the annular fixing portion in a radial direction, when a pressurized gas flows from the pressurized gas chamber to the gas discharge port, the pressurized gas passing through a gas passage to be discharged from the gas discharge port, the gas passage including a first annular passage in which a width between the enlarged-diameter portion and the annular fixing portion varies, and a second annular passage between the rod main body portion and the annular fixing portion, a cross-sectional area of the second annular passage being the smallest among the cross-sectional area of the second annular passage, an area of a minimum width portion of the first annular passage and a total opening area of the gas discharge port, and Q<(A2-A1) being satisfied when Q denotes the cross-sectional area of the second annular passage, A1 denotes the area of the punched-out rupturable plate and A2 denotes an area of the minimum width portion of the first annular passage.

Preferably, in the gas generator of the Invention 1, the cross-sectional area of the second annular passage is the smallest among the area of the minimum width portion of the first annular passage, the cross-sectional area of the second annular passage and the total opening area of the gas discharge ports.

The Invention 2 of the present invention provides a gas generator, including a cylindrical housing having a first end whose opening is fixed with an ignition device, and a closed second end on an axially opposite side of the first end, the cylindrical housing including an ignition device chamber provided with the ignition device, a gas inflow chamber having a plurality of gas discharge ports, and a pressurized gas chamber, the ignition device chamber, the gas inflow chamber and the pressurized gas chamber being arranged in the cylindrical housing, in the above order from the first end;

a rupturable plate closing between the pressurized gas chamber and the gas inflow chamber and being fixed to an annular fixing portion extending radially inward from an inner circumferential wall surface of the cylindrical housing;

a breaking device for the rupturable plate being arranged between the ignition device chamber and the gas inflow chamber, the breaking device including, a base whose outer circumferential surface abuts against the inner circumferential wall surface of the cylindrical housing, the base moving by a predetermined length (a length L) during actuation, and a rod which extends from the base towards the rupturable plate, the rod including a rod main body portion which extends from the base, and an enlarged-diameter portion which has a diameter enlarged radially at a distal end portion of the rod main body portion;

the rupturable plate being fixed to the annular fixing portion, the rupturable plate facing a distal end surface of the enlarged diameter portion, when the base of the breaking device moves in the axial direction by the length L during actuation, the enlarged-diameter portion of the breaking device being positioned inside the pressurized gas chamber after punching out the rupturable plate from the annular fixing portion, and the rod main body portion being positioned so as to oppose the annular fixing portion in a radial direction, when a pressurized gas flows from the pressurized gas chamber to the gas discharge ports, the pressurized gas passing through a gas passage to be discharged from the gas discharge ports, the gas passage including a first annular passage in which a width between the enlarged-diameter portion and the annular fixing portion varies, and a second annular passage between the rod main body portion and the annular fixing portion, a cross-sectional area of the second annular passage being the smallest among the cross-sectional area of the second annular passage, an area of a minimum width portion of the first annular passage and a total opening area of the gas discharge ports, Q<(A3-Z) being satisfied when Q denotes the cross-sectional area of the second annular passage, A3 denotes the total opening area of the gas discharge ports, and Z denotes an area of part of the gas discharge ports closed by the punched-out rupturable plate.

Preferably, in the gas generator of the Invention 2, the cross-sectional area of the second annular passage is the smallest among the area of the minimum width portion of the first annular passage, the cross-sectional area of the second annular passage and the total opening area of the gas discharge ports.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In the inflator disclosed in U.S. Pat. No. 5,242,194, it is necessary that, after cutting out the burst disk 52 in a donut shape by a two-stage operation, the pointed tip 155 of the piston 132 is entirely fitted to the opening 102 of the holder 86 while holding the bust disk 52 cut out in the donut shape. Since operations are complicated in this manner, there is room for improvement in terms of reliability of operations.

The present invention provides a gas generator which is usable for an airbag apparatus to be installed on a vehicle and in which a pressurized gas is used. The gas generator is capable of maintaining reliability of actuation over the service period of the vehicle.

The ignition device chamber includes a known electric igniter used in a gas generator for an airbag apparatus. If necessary, a transfer charge or a gas generating agent can be used therewith.

A gas generated from the gas generating agent can be used for airbag deployment.

The pressurized gas chamber is filled with a gas such as argon, helium, or nitrogen gas under a required pressure.

The gas discharge port is formed in the cylindrical housing at a location where the gas inflow chamber is formed, and the gas discharge port may be closed from the inside by a seal tape. A cylindrical filter can be disposed at a position such as to cover the gas discharge port from the inside.

The ignition device chamber and the gas inflow chamber are at atmospheric pressure, and the pressurized gas chamber is kept under high pressure.

The rupturable plate is fixed to the annular fixing portion extending radially inward from the inner circumferential wall surface of the cylindrical housing.

The rupturable plate can be either one of the followings:

a rupturable plate including an annular welded portion which is welded and fixed to the annular fixing portion from the pressurized gas chamber, and a circular non-welded portion which is present on the inner side of the annular welded portion; and a rupturable plate in which the annular fixing portion and the rupturable plate are integrally formed and a fragile portion is provided.

In a rupturable plate in which the annular fixing portion and the rupturable plate are integrally formed, a portion punched out by the breaking device corresponds to the rupturable plate and the remaining portion corresponds to the annular fixing portion.

It is possible that the annular fixing portion includes an annular plate surface portion extending radially inward from the inner circumferential wall surface of the cylindrical housing, and a cylindrical wall portion extending toward the gas inflow chamber from an inner circumferential portion of the annular plate surface portion.

When the annular fixing portion includes the annular plate surface portion and the cylindrical wall portion, the rupturable plate is welded and fixed to the annular plate surface portion and, after actuation, it is possible that a space between the rod main body portion and the cylindrical wall portion is a second annular passage.

The breaking device includes the base and the rod, and the rod includes the rod main body portion and the enlarged-diameter portion.

The outer circumferential surface of the base abuts against the inner circumferential wall surface of the cylindrical housing, and the base is capable of moving in an axial direction by a predetermined length (a length L) during actuation.

In the base, a through hole, a groove, or the like can be formed to allow passage of a combustion gas during actuation when a gas generating agent is filled inside the ignition device chamber. The through hole, the groove, or the like is closed by a closing member such as a seal tape before actuation.

The enlarged-diameter portion is a distal end portion of the rod main body portion with a diameter enlarged radially. A shape of the enlarged-diameter portion is not particularly limited and may, for example, have the following shapes:

(I) A section from the distal end portion of the rod main body portion to a distal end surface (a surface facing the rupturable plate) of the enlarged-diameter portion has a truncated cone shape;

(II) The distal end surface (the surface facing the rupturable plate) of the enlarged-diameter portion has a disk shape and a section from the disk-shaped portion to the distal end portion of the rod main body portion has a truncated cone shape; and (III) The distal end portion of the rod main body portion has a disk-shaped enlarged-diameter portion.

Before actuation, a movement of the base in the axial direction is restricted by, for example, a low protrusion or the like which protrudes from the inner circumferential wall surface of the cylindrical housing.

Since the base is subjected to large pressure from the ignition device chamber provided with an ignition device during actuation, the base moves over the low protrusion described above and proceeds in the axial direction. However, once the base moves by a length L, the movement is stopped, for example, by a protrusion which protrudes from the inner circumferential wall surface of the cylindrical housing or by a step portion obtained by reducing an inner diameter of the cylindrical housing. Subsequently, the base is fixed thereby and prevented from moving in reverse.

The rod main body portion has a uniform outer diameter between the base and the enlarged-diameter portion and, in a fixed state after the movement, the second annular passage whose cross-sectional area is always constant is formed.

After the base moves in the axial direction by the length L, the enlarged-diameter portion at the distal end of the rod main body portion punches out the rupturable plate and then is positioned inside the pressurized gas chamber.

At this point, the rod main body portion is at a position radially opposing the annular fixing portion (or the cylindrical wall portion) to which the rupturable plate had been fixed.

The rupturable plate is punched out as described above, and thereby, a gas discharge path from the pressurized gas chamber to the gas discharge port of the gas inflow chamber is opened.

When a pressurized gas flows from the pressurized gas chamber to the gas discharge port, the pressurized gas passes through an annular passage (a first annular passage) between the enlarged-diameter portion inside the pressurized gas chamber and the annular fixing portion and then through an annular passage (a second annular passage) between the rod main body portion and the annular fixing portion, and subsequently the pressurized gas flows into the gas inflow chamber and is discharged from the gas discharge port.

The first annular passage is an annular passage between the enlarged-diameter portion with a diameter enlarged radially at the distal end portion of the rod main body portion, and the annular fixing portion (or the cylindrical wall portion) extending radially inward from the inner circumferential wall surface of the cylindrical housing. A shape of the enlarged-diameter portion is not specified (for example, (I) to (III) described earlier). Therefore, an interval (a width) between a surface of the enlarged-diameter portion and the annular fixing portion varies at a plurality of locations and, at some locations, an orientation of the annular passage does not coincide with the axial direction of the housing.

As a result, the first annular passage includes a minimum width portion and a maximum width portion between the enlarged-diameter portion and the annular fixing portion, and also includes a medium width portion of the above two portions. Further, an orientation of the annular passage differs at each portion. Accordingly, the first annular passage is represented by an "area" of the minimum width portion.

Since a width of the second annular passage is constant and the orientation of the annular passage coincides with the axial direction of the housing, the second annular passage is represented by a "cross-sectional area" in the radial direction of the housing.

In the gas generator of the present invention, the cross-sectional area of the second annular passage is the smallest among the cross-sectional area of the second annular passage, the area of the minimum width portion of the first annular passage and the total opening area of the gas discharge port.

The gas generator of the present invention controls a flow amount of a pressurized gas in the second annular passage by setting the cross-sectional area of the second annular passage to be the smallest.

In the gas generator of the present invention, when Q denotes a cross-sectional area of the second annular passage, A1 denotes an area of the punched-out rupturable plate, and A2 denotes an area of the minimum width portion of the first annular passage, $Q<(A2-A1)$ is satisfied.

During actuation, the rupturable plate is punched out in a circular shape and the punched-out rupturable plate enters the pressurized gas chamber. At this point, the rupturable plate conceivably maintains a circular state created when punched out, but it is also conceivable that the rupturable plate is deformed when punched out.

Further, it is also conceivable that, due to outflow of the pressurized gas, the rupturable plate, which has once entered the pressurized gas chamber, moves to the first annular passage and closes part of the passage, thereby reducing an amount of the gas flow.

In this case, if an amount of the gas flow in the first annular passage becomes less than an amount of the gas flow in the second annular passage, the amount of the gas flow is less than a designed amount of gas flow. As a result, output performance is deteriorated and, when used in an airbag apparatus, an expansion speed of the airbag decreases.

However, by satisfying $Q<(A2-A1)$ as described above, even when a situation occurs where the punched-out rupturable plate closes part of the first annular passage, a flow amount of a pressurized gas is controlled in the second annular passage.

Preferably in the gas generator of the present invention, an electric igniter and a gas generating agent are accommodated as the ignition device in the ignition device chamber, the base of the breaking device separates the ignition device chamber from the gas inflow chamber, the base has a through hole which extends in a thickness direction and is closed by a seal tape, and a total opening area Y of the through hole and a total surface area B of a molded article of gas generating agent satisfy a relationship expressed by $Y<B$, and the total opening area Y of the through hole and a total opening area A3 of the gas discharge port satisfy a relationship expressed by Y<A3.

Furthermore, preferably in the gas generator of the present invention, a total opening area Y of a through hole, a groove, and the like formed in the base of the breaking device and the total surface area B of the molded article of gas generating agent satisfy a relationship expressed by Y<B and Y<A3 (the total opening area of the gas discharge port).

Accordingly, by satisfying the relationships expressed by Y<B and Y<A3, combustion performance of the gas generating agent in the ignition device chamber is independently controlled.

In the gas generator of the present invention, instead of Q<(A2−A1) described above, when Q denotes a cross-sectional area of the second annular passage, A3 denotes a total opening area of the gas discharge port, and Z denotes an area of part of the gas discharge port closed by the punched-out rupturable plate, Q<(A3−Z) is satisfied.

Even when the punched-out rupturable plate passes through the first annular passage and the second annular passage, enters the gas inflow chamber and closes part of the gas discharge port, by satisfying Q<(A3−Z), a flow amount of the pressurized gas is controlled in the second annular passage.

The gas generator of the present invention can satisfy both Q<(A2−A1) and Q<(A3−Z) described above. Specifically, it is possible that, in addition to Q<(A2−A1), when Q denotes a cross-sectional area of the second annular passage, A3 denotes a total opening area of the gas discharge port, and Z denotes an area of part of the gas discharge port closed by the punched-out rupturable plate, Q<(A3−Z) is satisfied.

During actuation, even when the punched-out rupturable plate closes part of the first annular passage, then passes through the first annular passage and the second annular passage, enters the gas inflow chamber and closes part of the gas discharge port, a flow amount of the pressurized gas is controlled in the second annular passage.

Further, during actuation, even when the punched-out rupturable plate breaks apart, a broken part closes part of the first annular passage, and a remaining broken part passes through the first annular passage and the second annular passage, enters the gas inflow chamber and closes part of the gas discharge port, a flow amount of the pressurized gas is controlled in the second annular passage.

Preferably in the gas generator of the present invention, an electric igniter and a gas generating agent are accommodated as the ignition device in the ignition device chamber, the base of the breaking device separates the ignition device chamber from the gas inflow chamber, the base includes a through hole which extends in a thickness direction and is closed by a seal tape, and a total opening area Y of the through hole and a total surface area B of a molded article of gas generating agent satisfy a relationship expressed by Y<B, and the total opening area Y of the through hole and the total opening area A3 of the gas discharge ports satisfy a relationship expressed by Y<(A3−Z).

Furthermore, preferably in the gas generator of the present invention, a total opening area Y of a through hole, a groove, and the like formed in the base of the breaking device and the total surface area B of the molded article of gas generating agent satisfy a relationship expressed by Y<B and Y<(A3−Z).

Accordingly, by satisfying the relationships expressed by Y<B and Y<(A3−Z), combustion performance of the gas generating agent in the ignition device chamber is independently controlled.

When the gas generator of the present invention is used in an airbag apparatus of a vehicle, the gas generator maintains the reliability of actuation over the service period of the vehicle.

Figure 1:
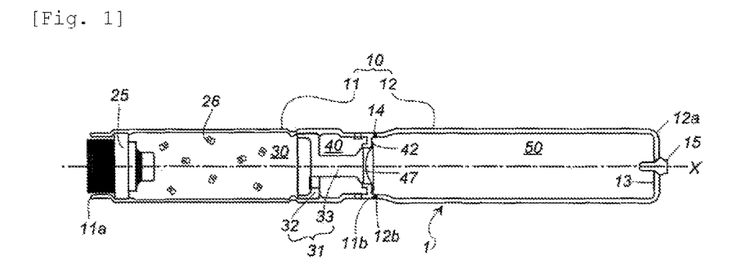
FIG. 1 shows a cross-sectional view in an X-axis direction of a gas generator of the present invention.

Embodiment of Invention (1) Gas Generator Depicted in FIG. 1

In a gas generator 1 depicted in FIG. 1, an ignition device chamber 30, a gas inflow chamber 40, and a pressurized gas chamber 50 are arranged inside a cylindrical housing 10.

The cylindrical housing 10 includes an ignition device chamber housing 11 and a pressurized gas chamber housing 12, but may be formed of a single housing as a whole.

In the ignition device chamber housing 11, an electric igniter 25 is fixed to an opening at a first end 11*a*.

A second end 12*a* of the pressurized gas chamber housing 12 is closed (a closing surface 13).

A second end 11*b* of the ignition device chamber housing 11 and a first end 12*b* of the pressurized gas chamber housing 12 are integrated by welding in a joint portion 14.

The cylindrical housing 10 (the ignition device chamber housing 11 and the pressurized gas chamber housing 12) is made of iron, stainless steel, or the like.

The inside of the pressurized gas chamber 50 is filled with a gas such as argon or helium under high pressure.

The gas is loaded from a gas filling hole in the closing surface 13 of the pressurized gas chamber housing 12. The gas filling hole may be formed in a circumferential wall surface of the pressurized gas chamber housing 12.

A pin 15 is inserted into the gas filling hole after the gas is filled, and then welded together with the closing surface 13 to close the gas filling hole.

A rupturable plate 47, which is welded and fixed to a fixing portion (an annular fixing portion) 42, closes between the pressurized gas chamber 50 and the gas inflow chamber 40.

The fixing portion 42 includes an annular plate surface portion 43 extended inward in the radial direction of the housing from the second end 11*b* of the ignition device chamber housing 11, and a cylindrical wall portion 44 extended from an inner circumferential portion of the annular plate surface portion 43 towards the gas inflow chamber 40. The rupturable plate 47 is welded and fixed to the annular plate surface portion 43 from the pressurized gas chamber 50.

The rupturable plate 47 is made of iron, stainless steel, or the like and includes an annular welded portion 47*a*, which is welded and fixed to the annular plate surface portion 43, and a circular non-welded portion 47*b* which is present on the inner side of the annular welded portion 47*a*.

The rupturable plate 47 receives a pressure from the pressurized gas chamber 50 and deforms to protrude towards the gas inflow chamber 40.

The gas inflow chamber 40 is a space into which the gas from the pressurized gas chamber 50 and a combustion gas from the ignition device chamber 30 flow during actuation.

Figure 2:
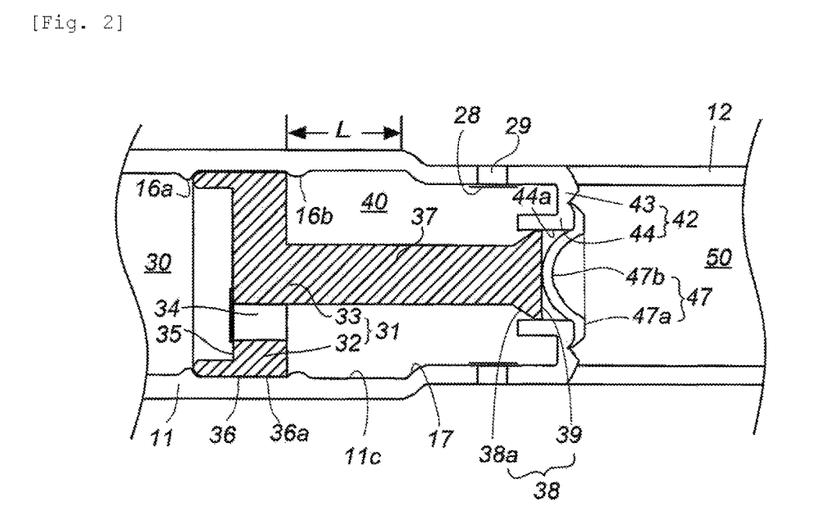
FIG. 2 shows a partially enlarged view of FIG. 1 depicting a state before actuation.

In FIG. 2, a plurality of gas discharge ports 29 are formed at a location facing the gas inflow chamber 40 in the ignition device chamber housing 11 and sealed from the inside with a metallic seal tape 28.

The plurality of the gas discharge ports 29 are formed equidistantly in the circumferential direction of the ignition device chamber housing 11. The plurality of the gas discharge ports 29 may be circumferentially arranged in two rows in an X-axis direction or may be circumferentially arranged in a zigzag pattern.

A cylindrical filter may be disposed at a position facing the gas discharge ports 29 in the gas inflow chamber 40.

In the gas inflow chamber 40, a step portion 17 is formed between the ignition device chamber 30 and the rupturable plate 47.

The step portion 17 is obtained by reducing the inner diameter of the ignition device chamber housing 11 between the ignition device chamber 30 and the rupturable plate 47. A plurality of protrusions protruding inward from an inner circumferential wall surface 11c of the ignition device chamber housing 11 may be formed instead of the step portion 17.

A breaking device 31 including a base 32 and a rod 33 which extends from the base 32 towards the rupturable plate 47, is disposed between the gas inflow chamber 40 and the ignition device chamber 30.

Figure 8:
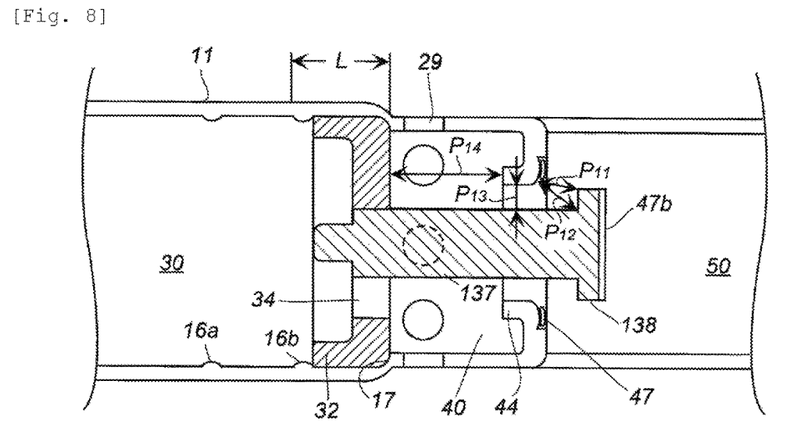
FIG. 8 shows a partially enlarged cross-sectional view of a gas generator of an embodiment which differs from the embodiment depicted in FIG. 1 and depicts a state of actuation.
Figure 9:
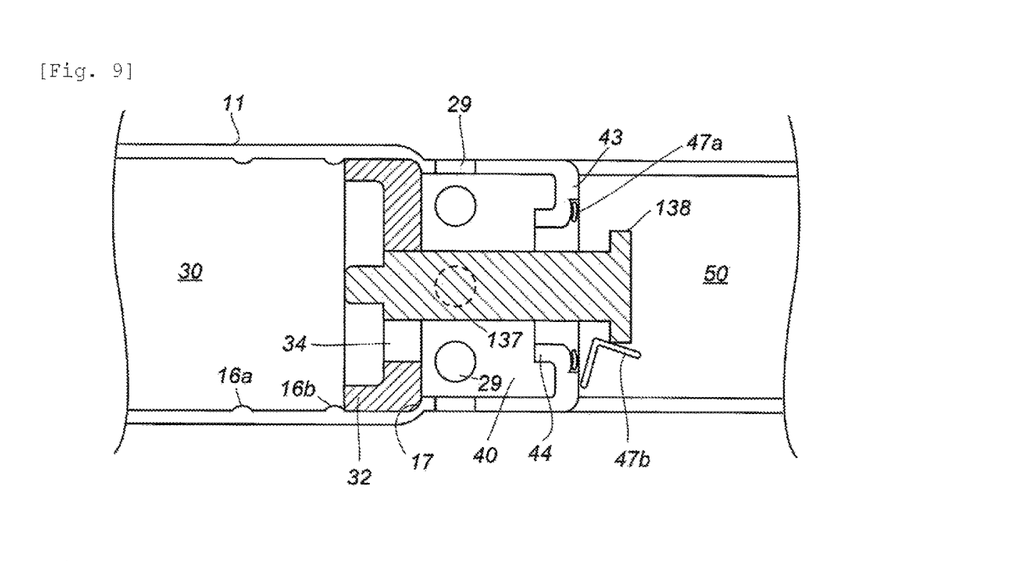
FIG. 9 shows a partially enlarged cross-sectional view of FIG. 8 and depicts a state of actuation after the state depicted in FIG. 8.
Figure 10:
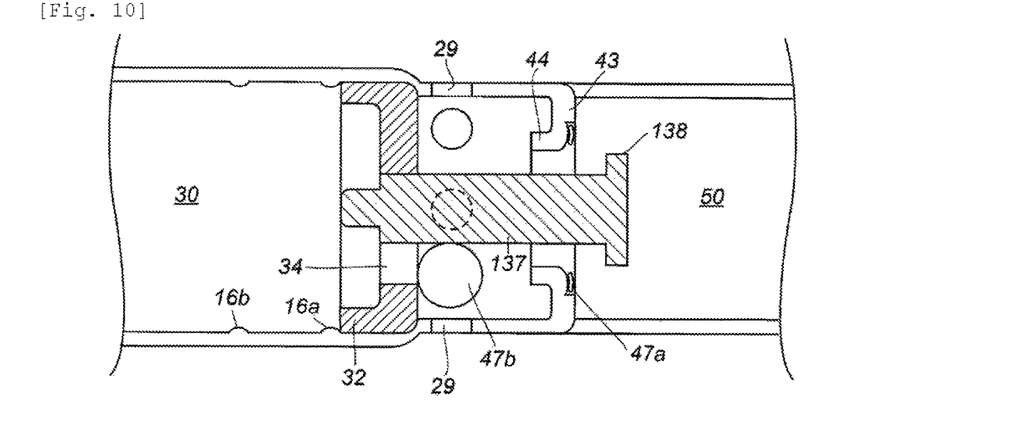
FIG. 10 shows a partially enlarged cross-sectional view of a gas generator of an embodiment which differs from the embodiment depicted in FIG. 8 and depicts a state of actuation.

In the breaking device 31 depicted in FIGS. 1 and 2, the base 32 and the rod 33 are integrated. As depicted in FIGS. 8 to 10, a rod main body portion 137 may be fitted into the base 32 and integrated so as not to detach during actuation.

The base 32 includes a disk portion 35 having a plurality of through holes 34 in a thickness direction and a cylindrical wall surface portion 36 extending from an outer circumference of the disk portion 35 towards the igniter 25.

The through holes 34 are closed, from the ignition device chamber 30, with a seal tape made of a material selected from aluminum, iron, stainless steel and resin.

In the base 32, an outer circumferential surface 36a of the cylindrical wall surface portion 36 abuts against the inner circumferential wall surface 11c of the ignition device chamber housing 11 such that the base 32 can slide in the X-axis direction. Since a length of the cylindrical wall surface portion 36 in the X-axis direction is larger than the thickness of the disk portion 35, the rod 33 is not inclined with respect to the X-axis and the base 32 slides parallel to the X-axis direction.

The cylindrical wall surface portion 36 is held from both sides in the thickness direction by two protrusions 16a and 16b protruding inward, at a distance in the axial direction from each other, from the inner circumferential wall surface 11c of the ignition device chamber housing 11.

A sealing agent is coated between the outer circumferential surface 36a of the cylindrical wall surface portion 36 and the inner circumferential wall surface 11c of the ignition device chamber housing 11 to ensure air tightness of the ignition device chamber 30.

The rod 33 includes a rod main body portion 37 extending from the base 32, and an enlarged-diameter portion 38 with a diameter enlarged radially outward from the rod main body portion 37.

Figure 3:
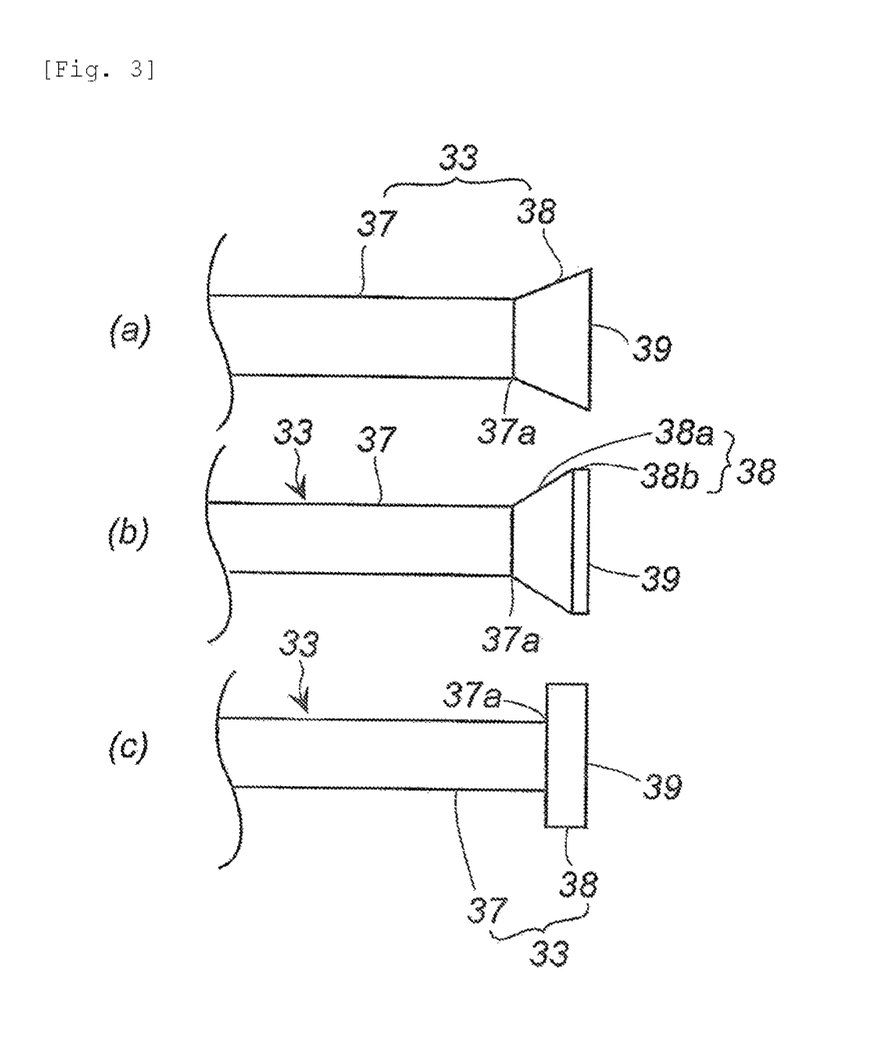
FIG. 3 shows, in each of (a), (b) and (c), a partial plan view of a breaking device of a different embodiment of a breaking device used in FIGS. 1 and 2.

As the rod 33, a rod shaped as depicted in (a) to (c) in FIG. 3 can be used.

The rod 33 depicted in (a) in FIG. 3 includes the enlarged-diameter portion 38 with a truncated cone shape which extends from a distal end portion 37a of the rod main body portion 37. A distal end surface 39 of the enlarged-diameter portion 38 is arranged to face the rupturable plate 47.

The rod 33 depicted in (b) in FIG. 3 includes the enlarged-diameter portion 38 including a truncated cone portion 38a, which extends from a distal end portion 37a of the rod main body portion 37, and a disk portion 38b which continues from the truncated cone portion 38a. The distal end surface 39 of the enlarged-diameter portion 38 (the disk portion 38b) is arranged to face the rupturable plate 47.

The rod 33 depicted in (c) in FIG. 3 includes the enlarged-diameter portion 38 in a disk shape at the distal end portion 37a of the rod main body portion 37. The distal end surface 39 of the enlarged-diameter portion 38 is arranged to face the rupturable plate 47.

In the ignition device chamber 30, the igniter 25 is fixed at the first end 11a, and the opposite side thereof in the X-axis direction is partitioned by the base 32.

The inside of the ignition device chamber 30 is filled with a predetermined amount of a molded article of gas generating agent 26.

A combustion performance of the molded article of gas generating agent 26 in the ignition device chamber 30 is controlled by setting a total opening area Y of the through holes 34 formed in the base 32 and a total surface area B of the molded article of gas generating agent 26 to satisfy Y<B. In this case, a relationship expressed by Y<A3 (a total opening area of the gas discharge ports 29) is satisfied.

Next, the operation of the gas generator 1 depicted in FIGS. 1 and 2 when used as a gas generator for an airbag system of a vehicle will be explained with reference to FIGS. 4 to 7. Moreover, in the gas generator 1, a breaking device including the enlarged-diameter portion 38 depicted in (b) in FIG. 3 is used as the breaking device 31.

As depicted in FIGS. 1 and 2, before actuation, the enlarged-diameter portion 38 which is a distal end portion of the rod 33 is arranged so as to be enclosed by the cylindrical wall portion 44 of the annular fixing portion 42. At this point, a slight gap is formed between an outer circumferential portion of the enlarged-diameter portion 38 and an inner circumferential surface 44a of the cylindrical wall portion 44.

The molded article of gas generating agent 26 is ignited and burned by a combustion product generated by the actuation of the igniter 25, and a high-temperature combustion gas is produced.

When the pressure inside the ignition device chamber 30 is increased by the combustion gas, the base 32 of the breaking device 31 moves over the protrusion 16b, and the base 32 slides and moves along the inner circumferential wall surface 11c of the ignition device chamber housing in the X-axis direction.

The base 32 then stops as a result of colliding with the step portion 17 with the reduced inner diameter. At this point, the base 32 and the enlarged-diameter portion 38 have moved in the X-axis direction by a length L.

When the base 32 moves by the length L, the distal end surface 39 of the enlarged-diameter portion 38 of the rod 33 collides with the non-welded portion 47b of the rupturable plate 47 and punches out a circular shape of the non-welded portion 47b and the annular welded portion 47a which is welded to the annular plate surface portion 43 remains. In this state, a circumferential edge of the cylindrical wall surface portion 36, which faces the ignition device chamber 30, collides with the protrusion 16b and the breaking device 31 is prevented from moving in reverse.

A length of the cylindrical wall surface portion 36 in the X-axis direction and is positioned of the protrusions 16a and 16b and the step portion 17 are adjusted so as to enable such operations.

Figure 4:
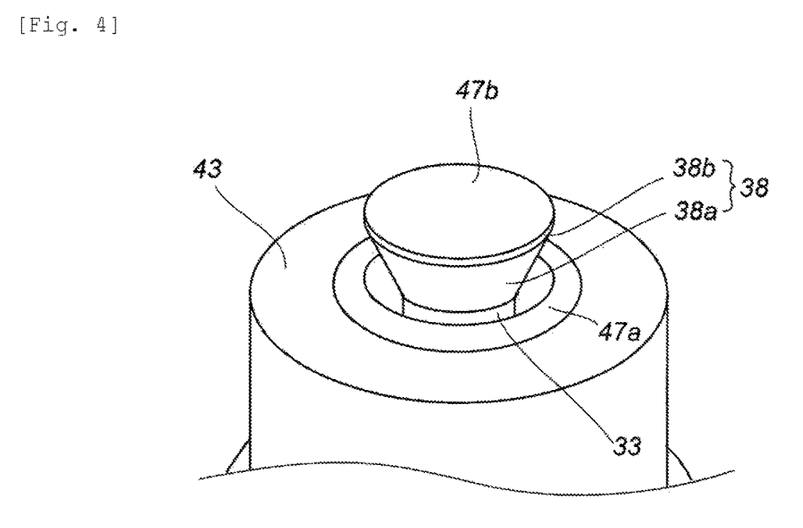
FIG. 4 shows a partial perspective view of FIG. 2 depicting a state after actuation.
Figure 5:
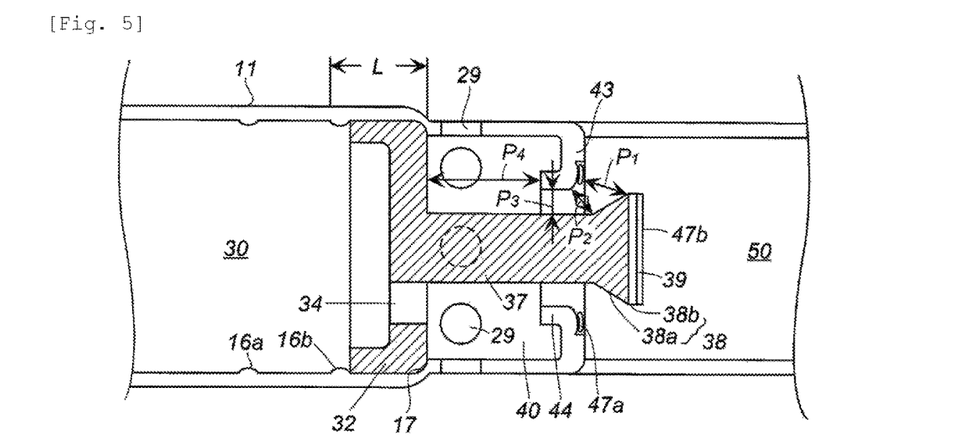
FIG. 5 shows a partially enlarged view of FIG. 1 showing a state after actuation.
Figure 6:
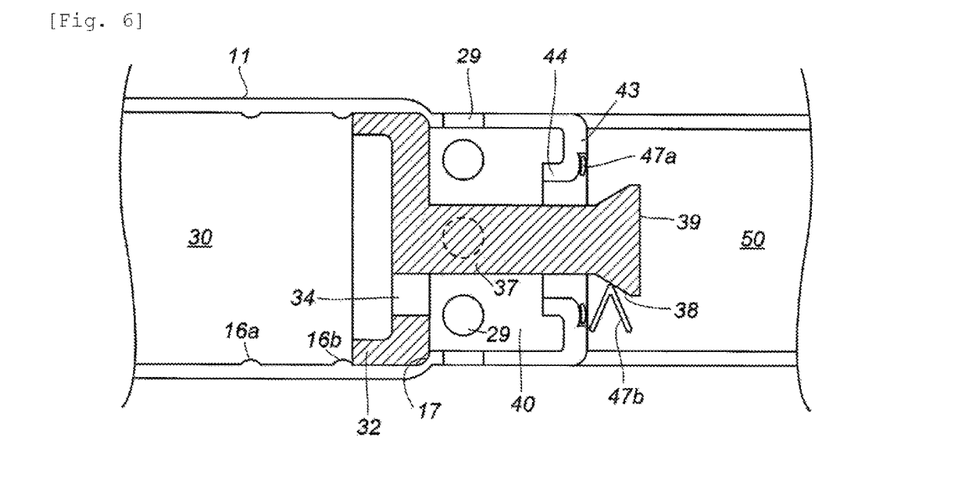
FIG. 6 shows a partially enlarged view of FIG. 1 depicting a state of actuation after the state depicted in FIG. 5.

FIGS. 4 and 5 depict a state where the non-welded portion 47b remains on the distal end surface 39 of the enlarged-diameter portion 38 after the non-welded portion 47b of the rupturable plate 47 is punched out.

In the state depicted in FIGS. 4 and 5, the enlarged-diameter portion 38 is positioned inside the pressurized gas chamber 50 and the rod main body portion 37 is at a position opposing the cylindrical wall portion 44 in the radial direction of the housing.

At this point, a first annular passage with a varying width is formed between the annular fixing portion 42 (the annular plate surface portion 43 and the cylindrical wall portion 44) and the enlarged-diameter portion 38.

Depending on a state of the welded portion 47a of the rupturable plate remaining in the annular fixing portion 42 (the annular plate surface portion 43 and the cylindrical wall portion 44), there may be cases where the first annular passage is formed between the welded portion 47a and the enlarged-diameter portion 38.

The first annular passage includes a 1-a annular passage having a width that is a minimum distance P1 between a boundary portion between the disk portion 38b and the truncated cone portion 38a in the enlarged-diameter portion 38, and the annular fixing portion 42 (the annular plate surface portion 43 and the cylindrical wall portion 44), and a 1-b annular passage having a width that is a minimum distance P2 between a boundary portion (the distal end portion 37a of the rod main body portion 37) between the rod main body portion 37 and the enlarged-diameter portion 38, and the annular fixing portion 42 (the annular plate surface portion 43 and the cylindrical wall portion 44).

A second annular passage with a width P3 is formed between the cylindrical wall portion 44 and the rod main body portion 37.

Widths of P1, P2, and P3 satisfy P1>P2>P3, and therefore a width from the 1-a annular passage to the second annular passage varies.

In this case, when Q denotes a cross-sectional area of the second annular passage (the width P3), A1 denotes an area of the non-welded portion 47b punched out in a circular shape and A2 denotes an area of the 1-b annular passage (the width P2) which is a minimum width portion of the first annular passage, Q<(A2−A1) is satisfied.

Furthermore, when Q denotes the cross-sectional area of the second annular passage (the width P3), A3 denotes a total opening area of the gas discharge ports 29, and Z denotes an area of the gas discharge ports 29 closed by the punched-out non-welded portion, Q<(A3−Z) is satisfied.

A pressurized gas in the pressurized gas chamber 50 passes through the 1-a annular passage (the width P1), the 1-b annular passage (the width P2), and the second annular passage (the width P3), and then flows into the gas inflow chamber 40.

In parallel with this, the seal tape closing the through holes 34 of the base 32 is broken and the combustion gas flows from the through holes 34 into the gas inflow chamber 40.

The combustion gas and the pressurized gas flowing into the gas inflow chamber 40 are discharged from the gas discharge ports 29. While the inside of the gas inflow chamber 40 also functions as a gas passage, even a minimum passage portion (a width P4: a distance between a distal end portion of the cylindrical wall portion 44 and the base 32) is sufficiently larger than P1, P2 and P3.

It can be considered that the combustion gas and the pressurized gas are discharged such that, after part of either one of the gases is discharged from the gas discharge ports 29, the remaining gases are discharged as a gas mixture. However, the gas discharge state or timing is not limited.

After the state depicted in FIG. 5, the non-welded portion 47b of the punched-out rupturable plate on the distal end surface 39 of the enlarged-diameter portion 38 separates from the distal end surface 39 and moves into the pressurized gas chamber 50. At this point, depending on an amount of protrusion of the distal end surface 39 from the annular plate surface portion 43, the non-welded portion 47b can close part of the 1-a annular passage (the width P1) and the area A2 can be reduced to (A2−A1).

However, since Q<(A2−A1) is satisfied as described earlier, even when the state depicted in FIG. 6 occurs, the cross-sectional area Q of the second annular passage (the width P3) is minimum and an amount of gas flow is controlled by the second annular passage (the width P3). Therefore, performance of the gas generator 1 is totally unaffected.

Figure 7:
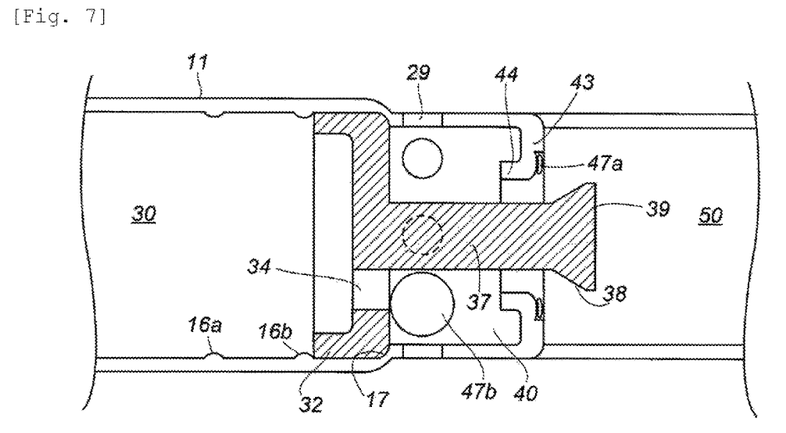
FIG. 7 shows a partially enlarged view of FIG. 1 depicting a state of actuation which differs from the state depicted in FIG. 6.

Further, for example, as depicted in FIG. 7, the punched-out non-welded portion 47b of the rupturable plate passes through the first annular passage and the second annular passage and enters the gas inflow chamber 40, while maintaining the punched-out state (in a circular shape) or being in a slightly deformed state, and closes part of the gas discharge ports 29, and thereby, the total opening area of the gas discharge ports 29 decreases.

However, since Q<(A3−Z) is satisfied as described earlier, even when the state depicted in FIG. 7 occurs, the cross-sectional area Q of the second annular passage (the width P3) is minimum and an amount of gas flow is controlled by the second annular passage (the width P3). Therefore, output performance of the gas generator 1 is totally unaffected.

Otherwise, even when, after temporarily closing the first annular passage, the punched-out non-welded portion 47b of the rupturable plate passes through the first annular passage and the second annular passage, enters the gas inflow chamber 40, and then closes part of the gas discharge ports 29, since both Q<(A2−A1) and Q<(A3−Z) are satisfied, an amount of gas flow is controlled by the second annular passage (the width P3). Therefore, the output performance of the gas generator 1 is totally unaffected.

Further, even when the non-welded portion 47b of the punched-out rupturable plate breaks into a plurality of pieces, since an amount of gas flow is similarly controlled by the second annular passage (the width P3), the output performance of the gas generator 1 is totally unaffected.

(2) Embodiment Depicted in FIGS. 8 to 10

A gas generator depicted in FIGS. 8 to 10 is the same as the gas generator 1 depicted in FIG. 1 with the exception of replacing the breaking device 31 in the gas generator 1 depicted in FIG. 1 with the breaking device depicted in FIGS. 8 to 10 (the same as the breaking device depicted in (c) in FIG. 3).

A first annular passage includes an 1-a annular passage having a width which is a minimum distance P11 between a corner portion of an enlarged-diameter portion 138 on a side of a rod main body portion 137 and the annular fixing portion 42 (the annular plate surface portion 43 and the cylindrical wall portion 44), and an 1-b annular passage having a width which is a minimum distance P12 between a boundary portion between the rod main body portion 137 and the enlarged-diameter portion 138, and the annular fixing portion 42 (the annular plate surface portion 43 and the cylindrical wall portion 44).

A second annular passage with a width P13 is formed between the cylindrical wall portion 44 and the rod main body portion 137.

Magnitudes of P11, P12 and P13 satisfy P12>P11>P13.

While the inside of the gas inflow chamber 40 also functions as a gas passage, even a minimum passage portion (a width P14: a distance between a distal end portion of the cylindrical wall portion 44 and the base 32) is sufficiently larger than P11, P12, and P13.

When Q denotes a cross-sectional area of the second annular passage (the width P13), A1 denotes an area of the non-welded portion 47b punched out in a circular shape, and A2 denotes an area of a gas passage (the 1-a annular passage with the width P11) which is a minimum width portion in the first annular passage, Q<(A2−A1) is satisfied.

Furthermore, when Q denotes the cross-sectional area of the second annular passage (the width P13), A3 denotes a total opening area of the gas discharge ports 29, and Z denotes an area of part of the gas discharge ports closed by the punched-out non-welded portion, Q<(A3−Z) is satisfied.

Therefore, even when the state depicted in FIG. 9 (a similar state to FIG. 6) and the state depicted in FIG. 10 (a similar state to FIG. 7) occur, the cross-sectional area Q of the second annular passage (the width P13) is the smallest and an amount of gas flow is controlled by the second annular passage (the width P13). Therefore, the output performance of the gas generator 1 is totally unaffected.

Further, after temporarily closing the first annular passage, the non-welded portion 47b of the punched-out rupturable plate can pass through the first annular passage and the second annular passage, enter the gas inflow chamber 40, and then close part of the gas discharge ports 29. In such a case, even if the non-welded portion 47b of the punched-out rupturable plate breaks into a plurality of pieces, an amount of gas flow is controlled by the second annular passage (the width P3) in a similar manner. Therefore, the output performance of the gas generator 1 is totally unaffected.

Even in the embodiments depicted in FIGS. 8 to 10, the combustion performance of the molded article of gas generating agent 26 in the ignition device chamber 30 is controlled by setting the total opening area Y of the through holes 34 formed in the base 32 and the total surface area B of the molded article of gas generating agent 26 so as to satisfy Y<B in a similar manner to the embodiments depicted in FIGS. 1 and 5 to 7. In this case, a relationship expressed by Y<(A3−Z) is satisfied.

During actuation, the gas generator of the present invention is capable of controlling a discharge amount of the pressurized gas from the inside of the pressurized gas chamber 50 by adjusting the cross-sectional area of the second annular passage.

Further, during actuation, the gas generator of the present invention is capable of controlling combustion performance of the gas generating agent 26 by associating the total opening area Y of the through holes 34 in the base 32 of the breaking device, the total opening area A3 (or A3−Z) of the gas discharge ports 29 and the total surface area B of the gas generating agent 26 with each other.

The gas generator of the present invention is capable of independently controlling a discharge amount of the gas from the inside of the pressurized gas chamber 50 and independently controlling combustion performance of the gas generating agent 26 inside the ignition device chamber 30 regardless of the state of actuation.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a cylindrical housing having a first end whose opening is fixed with an ignition device, and a closed second end on an axially opposite side of the first end, the cylindrical housing including an ignition device chamber provided with the ignition device, a gas inflow chamber having a gas discharge port, and a pressurized gas chamber, the ignition device chamber, the gas inflow chamber and the pressurized gas chamber being arranged in the cylindrical housing, in the above order from the first end;

a rupturable plate closing between the pressurized gas chamber and the gas inflow chamber and being fixed to an annular fixing portion extending radially inward from an inner circumferential wall surface of the cylindrical housing;

a breaking device for the rupturable plate being arranged between the ignition device chamber and the gas inflow chamber, the breaking device including,
a base whose outer circumferential surface abuts against the inner circumferential wall surface of the cylindrical housing, the base moving by a predetermined length (a length L) during actuation, and
a rod which extends from the base towards the rupturable plate, the rod including a rod main body portion which extends from the base, and an enlarged-diameter portion which has a diameter enlarged radially at a distal end portion of the rod main body portion;

the rupturable plate being fixed to the annular fixing portion, the rupturable plate facing a distal end surface of the enlarged diameter portion, when the base of the breaking device moves in the axial direction by the length L during actuation, the enlarged-diameter portion of the breaking device being positioned inside the pressurized gas chamber after punching out the rupturable plate from the annular fixing portion, and the rod main body portion being positioned so as to oppose the annular fixing portion in a radial direction, when a pressurized gas flows from the pressurized gas chamber to the gas discharge port, the pressurized gas passing through a gas passage to be discharged from the gas discharge port, the gas passage including a first annular passage in which a width between the enlarged-diameter portion and the annular fixing portion varies, and a second annular passage between the rod main body portion and the annular fixing portion, a cross-sectional area of the second annular passage being the smallest among the cross-sectional area of the second annular passage, an area of a minimum width portion of the first annular passage and a total opening area of the gas discharge port, and Q<(A2−A1) being satisfied when Q denotes the cross-sectional area of the second annular passage, A1 denotes the area of the punched-out rupturable plate and A2 denotes an area of the minimum width portion of the first annular passage.

2. A gas generator, comprising:
a cylindrical housing having a first end whose opening is fixed with an ignition device, and a closed second end on an axially opposite side of the first end, the cylindrical housing including an ignition device chamber provided with the ignition device, a gas inflow chamber having a plurality of gas discharge ports and a pressurized gas chamber, the ignition device chamber, the gas inflow chamber and the pressurized gas chamber being arranged in the cylindrical housing, in the above order from the first end;

a rupturable plate closing between the pressurized gas chamber and the gas inflow chamber and being fixed to an annular fixing portion extending radially inward from an inner circumferential wall surface of the cylindrical housing;

a breaking device for the rupturable plate being arranged between the ignition device chamber and the gas inflow chamber, the breaking device including, a base whose outer circumferential surface abuts against the inner circumferential wall surface of the cylindrical housing, the base moving by a predetermined length (a length L) during actuation, and a rod which extends from the base towards the rupturable plate, the rod including a rod main body portion which extends from the base, and an enlarged-diameter portion which has a diameter enlarged radially at a distal end portion of the rod main body portion;

the rupturable plate being fixed to the annular fixing portion, the rupturable plate facing a distal end surface of the enlarged diameter portion, when the base of the breaking device moves in the axial direction by the length L during actuation, the enlarged-diameter portion of the breaking device being positioned inside the pressurized gas chamber after punching out the rupturable plate from the annular fixing portion, and the rod main body portion being positioned so as to oppose the annular fixing portion in a radial direction, when a pressurized gas flows from the pressurized gas chamber to the gas discharge ports, the pressurized gas passing through a gas passage to be discharged from the gas discharge ports, the gas passage including a first annular passage in which a width between the enlarged-diameter portion and the annular fixing portion varies, and a second annular passage between the rod main body portion and the annular fixing portion, a cross-sectional area of the second annular passage being the smallest among the cross-sectional area of the second annular passage, an area of a minimum width portion of the first annular passage and a total opening area of the gas discharge ports, $Q<(A3-Z)$ being satisfied when Q denotes the cross-sectional area of the second annular passage, A3 denotes the total opening area of the gas discharge ports, and Z denotes an area of part of the gas discharge ports closed by the punched-out rupturable plate.

3. The gas generator according to claim 1, wherein, in addition to $Q<(A2-A1)$, when Q denotes the cross-sectional area of the second annular passage, A3 denotes a total opening area of the gas discharge port, and Z denotes an area of part of the gas discharge port closed by the punched-out rupturable plate, $Q<(A3-Z)$ is satisfied.

4. The gas generator according to claim 1, wherein,
the annular fixing portion includes an annular plate surface portion extending radially inward from the inner circumferential wall surface of the cylindrical housing, and a cylindrical wall portion extending toward the gas inflow chamber from an inner circumferential portion of the annular plate surface portion, and
a space between the rod main body portion and the cylindrical wall portion is a second annular passage.

5. The gas generator according to claim 1, wherein, an electric igniter and a gas generating agent are accommodated as the ignition device in the ignition device chamber,
the base of the breaking device separates the ignition device chamber from the gas inflow chamber,
the base has a through hole which extends in a thickness direction and is closed by a seal tape, and
a total opening area Y of the through hole and a total surface area B of a molded article of gas generating agent satisfy a relationship expressed by $Y<B$, and the total opening area Y of the through hole and a total opening area A3 of the gas discharge port satisfy a relationship expressed by $Y<A3$.

6. The gas generator according to claim 2, wherein, an electric igniter and a gas generating agent are accommodated as the ignition device in the ignition device chamber,
the base of the breaking device separates the ignition device chamber from the gas inflow chamber,
the base includes a through hole which extends in a thickness direction and is closed by a seal tape, and
a total opening area Y of the through hole and a total surface area B of a molded article of gas generating agent satisfy a relationship expressed by $Y<B$, and the total opening area Y of the through hole and the total opening area A3 of the gas discharge ports satisfy a relationship expressed by $Y<(A3-Z)$.

7. The gas generator according to claim 2, wherein,
the annular fixing portion includes an annular plate surface portion extending radially inward from the inner circumferential wall surface of the cylindrical housing, and a cylindrical wall portion extending toward the gas inflow chamber from an inner circumferential portion of the annular plate surface portion, and
a space between the rod main body portion and the cylindrical wall portion is a second annular passage.

* * * * *